United States Patent [19]

Hansenwinkle et al.

[11] 4,101,372

[45] Jul. 18, 1978

[54] WIDTH ADJUSTING THICKNESS SETTING CLAMPING SYSTEM

[75] Inventors: Earl Dean Hansenwinkle; Clement Kuanoni; Frank Wislocker, all of Longview, Wash.

[73] Assignee: Weyerhaeuser Company, Tacoma, Wash.

[21] Appl. No.: 759,167

[22] Filed: Jan. 13, 1977

[51] Int. Cl.[2] .................... B23K 27/00

[52] U.S. Cl. .................... 156/580; 29/252

[58] Field of Search .................... 29/252; 156/580; 100/232

[56] References Cited

U.S. PATENT DOCUMENTS

| | | | |
|---|---|---|---|
| 667,148 | 6/1901 | Webb | 100/232 |
| 3,511,175 | 5/1970 | Rugel | 156/580 |

*Primary Examiner*—James L. Jones, Jr.

[57] ABSTRACT

A method of joining a pair of elongated triangular-shaped pieces together by clamping includes the steps of bringing a pair of opposed face platens together to a predetermined thickness which is the thickness of the ultimately desired composite pair. A sliding edge platen is forced against the pair at a pressure sufficient to cause the two triangular-shaped pieces to slide relative to each other against a fixed edge platen to adjust for width and in order to bring the outer side faces of the pair into a substantially parallel relationship. At the end of the curing cycle the pressure is released from the face platens and sliding edge platen allowing them to move apart to their retracted positions and the composite pair may then be removed from the clamping system. A multi-opening clamping system has a plurality of individual clamping mechanisms mounted about the periphery of a rotating cylindrical frame. Each individual opening is capable of practicing the clamping and joining method as the multi-opening clamping system indexes in a substantially automatic manner. Included as parts of the multi-opening clamping system are a loading station, clamping station, unloading station, and an indexing and locking mechanism. Each individual clamping mechanism is comprised of a pair of axially extending, substantially parallel face platens, one of which is fixed and a pair of axially extending opposed edge platens, one of which is slidably mounted between the face platens. The edge platens are sized according to a predetermined thickness which is the final composite product thickness.

9 Claims, 13 Drawing Figures

Fig. 3
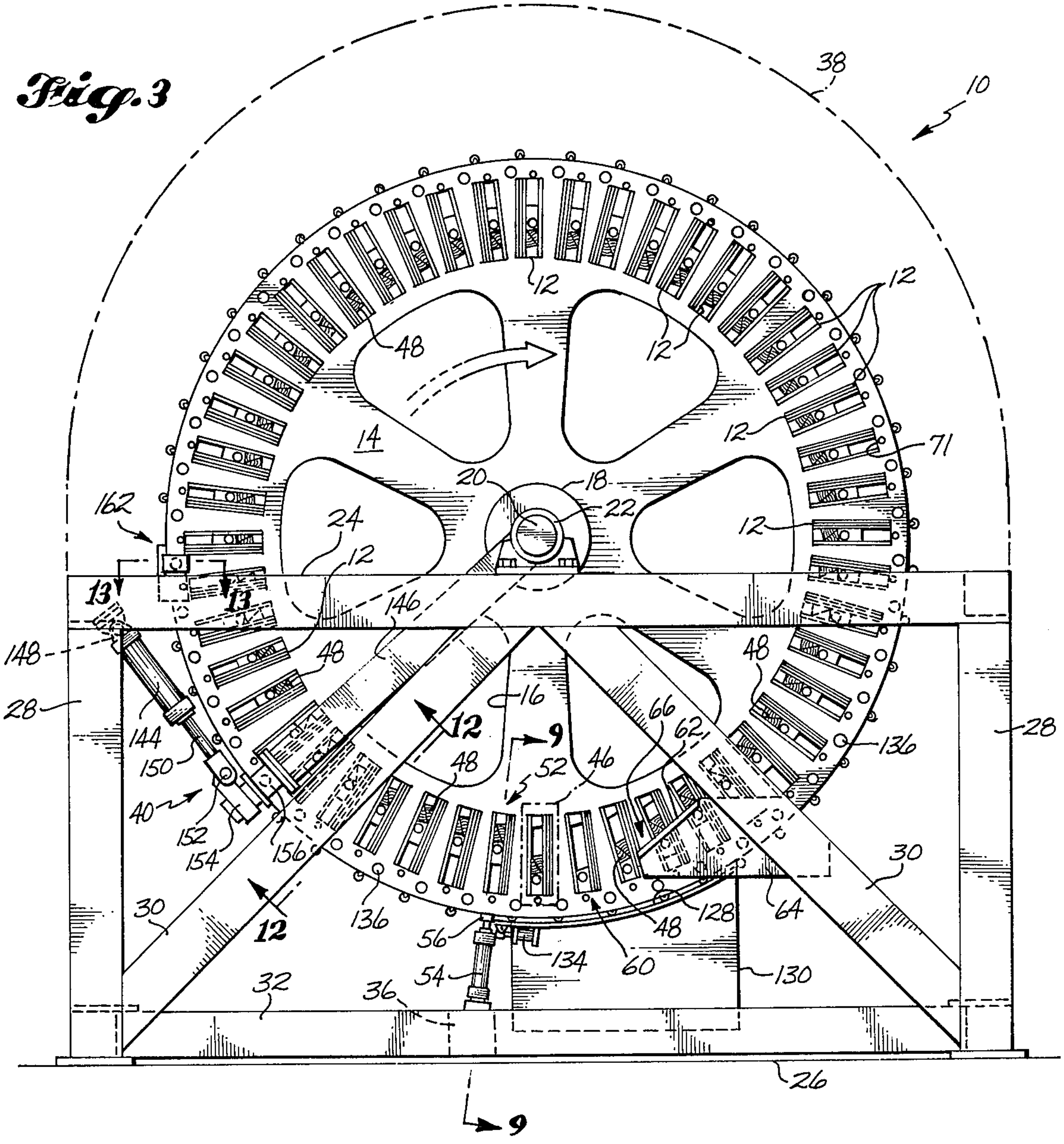
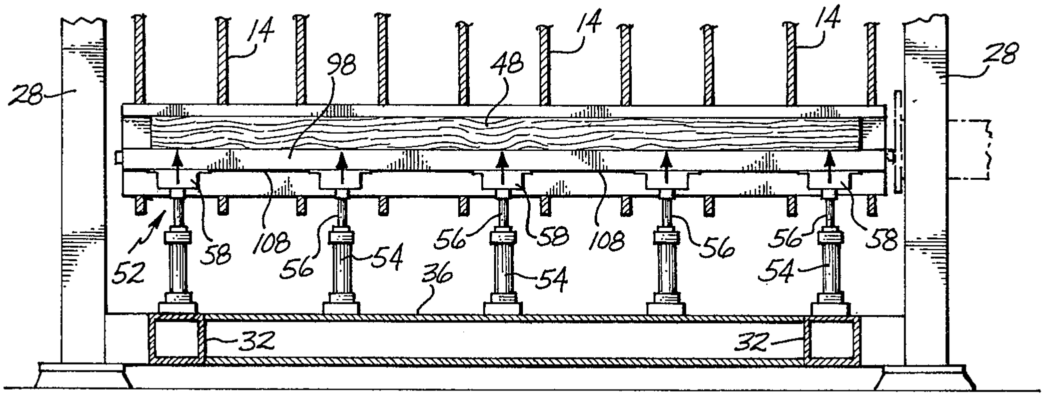
Fig. 9

WIDTH ADJUSTING THICKNESS SETTING CLAMPING SYSTEM

BACKGROUND OF THE INVENTION

This invention relates generally to clamping together two similarly sized, elongated, triangular-shaped pieces. More particularly, it relates to a system for two dimensional clamping at variable widths of a pair of elongated, triangular-shaped pieces. The resulting composite piece has two substantially parallel side faces and a predetermined thickness.

It has recently been discovered that substantial improvements in lumber yield can be gained by cutting a log first into a plurality of sector-shaped pieces, drying them, and then rejoining them into pairs through adhesively bonding such that the thin edge of one piece is approximately adjacent the thick edge of another piece, thereby forming parallelograms. The rough parallelograms are then machined into parallelograms of a maximum width having flat surfaces for further edge bonding of the pairs into wider widths. The edge bonded members can then be rip sawn to any required width and the shorter pieces of given widths can then be finger jointed together to form wide-width, long-length composite lumber products. The subject matter of this composite lumber manufacturing process is disclosed in issued U.S. Pat. No. 3,961,654, granted on June 8, 1976 and assigned to the assignee of the present invention. Additionally, another relatively new log cutting and rejoining process that rejoins smaller triangular- or sector-shaped pieces into composite members is that disclosed in issued U.S. Pat. No. 3,903,943 granted Sept. 9, 1975, also assigned to the assignee of the present invention. Both of the disclosures in these U.S. patents are incorporated by reference herein in order to provide one skilled in the art with a complete description and better understanding of the present invention.

In the aforementioned U.S. patents describing the processes of forming composite lumber products from triangular- or sector-shaped pieces, one of the steps in each process is that of adhesively bonding two substantially equally sized triangular-shaped pieces together into a composite piece having a predetermined thickness with substantially parallel side faces. When wooden pieces are being adhesively joined together, certain general procedures must be followed that will operate to form a satisfactory composite wood product. Of course, adhesively bonding wooden pieces together has been done for many years and certain well-known techniques and processes have been developed. However, there is presently no known suitable system for adhesively bonding two triangular-shaped pieces together as required in the processes disclosed in the aforementioned U.S. patents. Unlike conventional known adhesive bonding processes that require only edge pressure or face pressure, it is necessary to clamp and constrain the triangular-shaped pieces in both dimensions simultaneously because of the inclined joinder surfaces. If all of the triangular-shaped pieces to be clamped together into pairs were equally sized, it would be a relatively simple matter to design a suitable apparatus for clamping and joining together such triangular-shaped pieces. However, as disclosed in cited U.S. Pat. Nos. 3,961,654 and 3,903,943, the angles, as well as the thicknesses and widths, are variable depending primarily on the diameter of the particular log from which the pieces are cut. In addition, the width of an individual piece can vary along its length due to taper volume from the log. In the normal process, two similarly sized elongated triangular- or sector-shaped pieces will be preselected prior to clamping them together. In particular, the pieces to form a pair will have their included small angles substantially equal in size, this being necessary to result in a composite pair with the side faces being substantially parallel.

A method and apparatus is therefore necessary to clamp and bond triangular-shaped pieces together to form rough or finished composite members having a predetermined thickness at varying widths. The process and apparatus must also be capable of satisfying pressure and time requirements for good adhesive bonding practices and, in order to be commercially feasible, must be capable of operating rates compatible with other steps in the overall lumber manufacturing process. For example, these requirements may be on the order of 100 psi minimum glue line pressure for three minutes with a suitable operating rate being something on the order of fifteen pairs per minute.

With respect to the thicknesses of certain triangular-shaped pieces that will be clamped together, some selected pieces may have thicknesses of less than the ultimately desired composite thickness. With respect to those pieces having a narrower thickness, the clamping apparatus of the present invention can appropriately position each piece in relation to the other along the inclined joinder surfaces, such that the thickness of the resulting composite piece will be the predetermined thickness. Thus for clamping and adhesively bonding together two triangular-shaped pieces that may have slightly different thicknesses at varying widths, a machine system must be provided that will allow the variable thickness triangular-shaped pieces to slip along their juxtaposed faces in relation to each other to the predetermined thickness while accommodating the variable width of the pair. The machine system must then apply adequate clamping pressure for the necessary time to adequately bond the pieces together.

With respect to the operating rate at which the overall system produces bonded pairs of triangular-shaped pieces, it should be appreciated that the selected operating rate will be compatible with production requirements as well as with upstream and downstream equipment. In view of the cure times for commercially available adhesives, which might be on the order of from two to four minutes, it is apparent that a multi-opening clamping system will be required. In a multi-opening clamping system each of the individual clamping mechanisms must then be capable of providing the aforementioned requirements for adhesively bonding the individual triangular-shaped pieces.

Thus, from the foregoing, a primary object of the present invention is to provide a method and apparatus for clamping two elongated triangular-shaped pieces together to the predetermined thickness at a variable width.

Another object of this invention is to provide a clamp with uniform edge and face loading over the length of the pieces being clamped together.

Still a further object of this invention is to provide a multi-opening clamping system suitable for high production rates and for end loading and discharge.

Still a further object of this invention is to provide a clamping mechanism having sufficient face and edge clearance for loading and unloading.

Yet a further object of this invention is to provide an individual clamping mechanism that satisfies pressure and time requirements for meeting wood bonding standards.

These and other objects of the invention will become more apparent and better understood upon reading the specification to follow in conjunction with the attached drawings.

SUMMARY OF THE INVENTION

Briefly stated, the present invention comprises in one form a multi-opening rotary clamping system having loading, unloading, and clamping stations and indexing means for rotating a cylindrical frame. An individual clamping mechanism is comprised in part of at least one elongated fixed first edge platen together with at least two substantially parallel first and second face platens, one of which is fixed and the other of which is movable, towards or away from the fixed platens. A second edge platen is slidable between the first and second face platens from a first retracted position to a second position where it will be engaging an edge of one triangular-shaped piece of a pair, pushing it toward the first edge platen. The method of clamping includes the insertion of two elongated triangular-shaped pieces with the thin edge of one being approximately adjacent the thick edge of the other into an individual clamping mechanism. The slidable edge platen is caused to move toward the other edge platen, allowing the two elongated triangular-shaped pieces to reposition themselves such that the two outer side faces become substantially parallel in orientation at a fixed distance apart. The two substantially parallel face platens are then caused to move toward each other to a fixed distance apart as determined by the thickness of the edge platens. The slidable edge platen is clamped in place and remains clamped during the cycle time since the face platens are continuously urged against the edge platens. Once a cycle is completed, the pressure on the face platens is released and they move apart allowing the slidable edge platen to return to its first position. The cured composite piece is then removed from the clamping mechanism.

BRIEF DESCRIPTION OF THE DRAWINGS

FIG. 3 is an end elevation view, also showing the rotatable multi-opening clamping system.

FIG. 9 is a partial side elevation view in section taken along line 9—9 of FIG. 3 and shows the bottom rams extended upwardly to exert the appropriate operating force on the slidable edge platen at the clamping station.

DESCRIPTION OF THE PREFERRED EMBODIMENT

Figure 1:
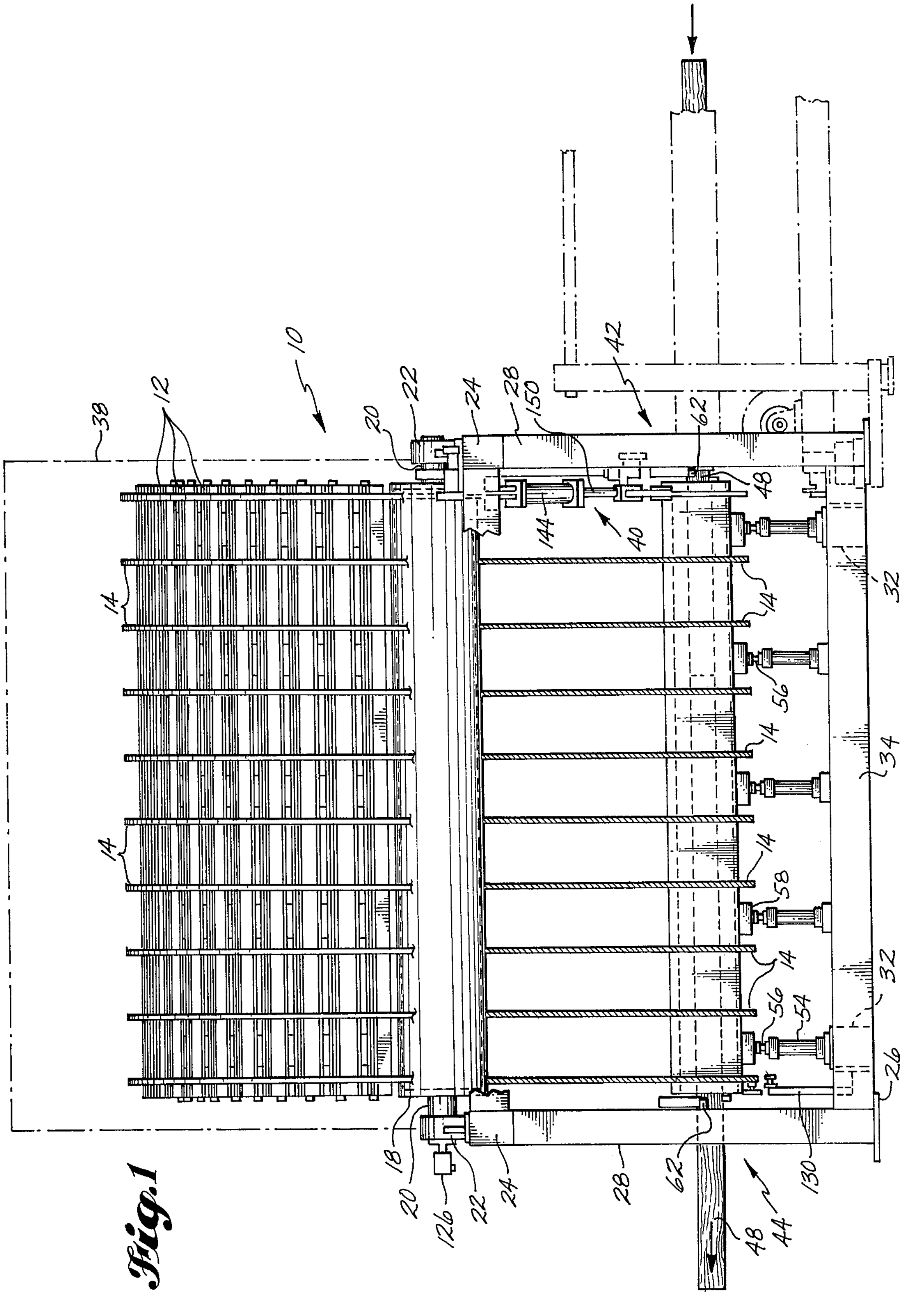
FIG. 1 is a side elevation view, partially in section, of the rotatable cylindrical multi-opening clamping system.
Figure 2:
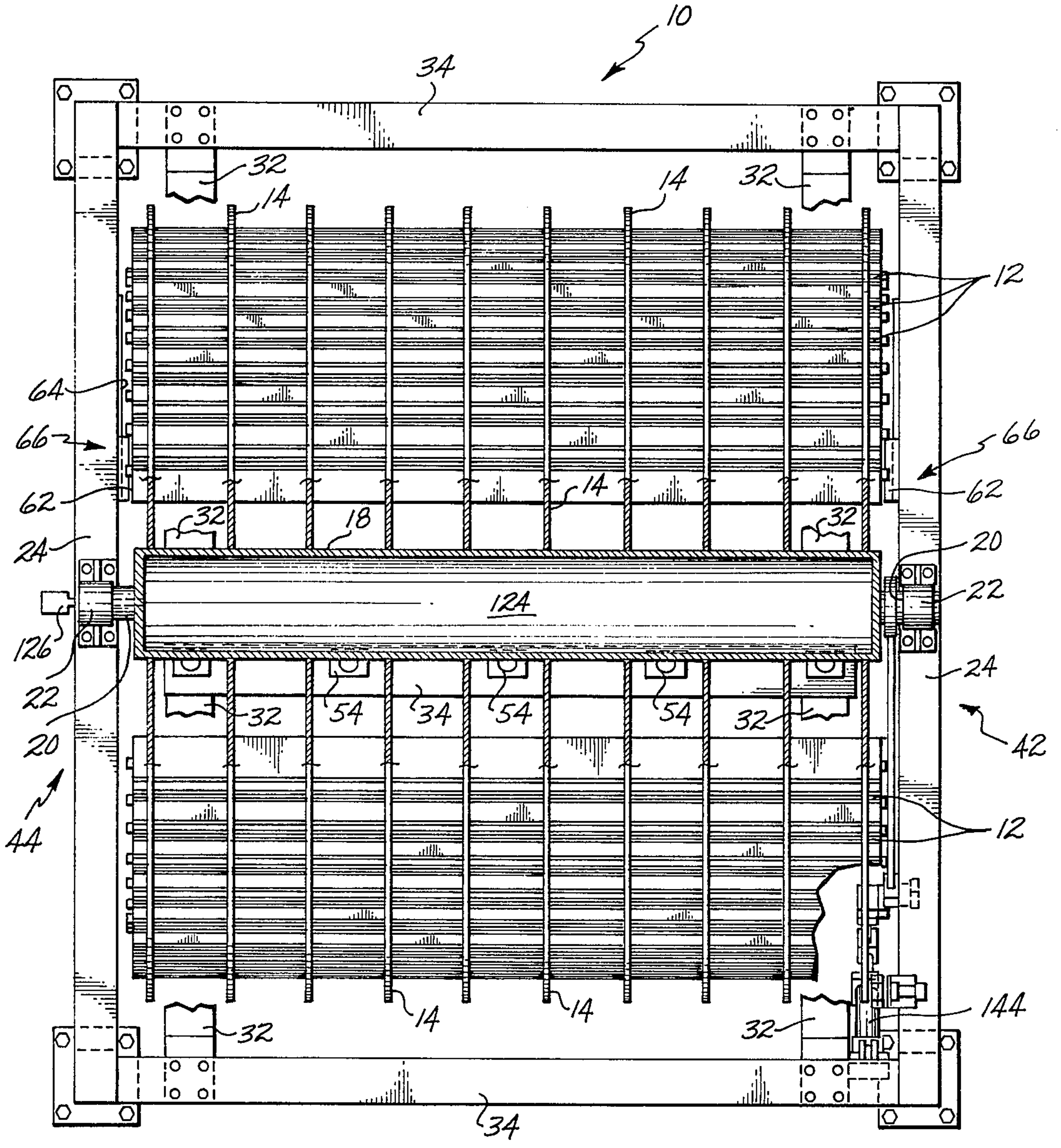
FIG. 2 is a top plan view, with the central portion being cut away, also showing the multi-opening clamping system.

Referring first to FIGS. 1–3, a rotatable cylindrical multi-opening clamping system is generally indicated at 10 and has a plurality of individually mounted clamping mechanisms or openings 12 spaced about the periphery of multi-opening clamping system 10. The individual clamps 12 extend axially and are supported in the proper orientation by a plurality of axially spaced circular frame elements 14. Each frame element has a plurality of suitably sized and spaced cutouts 16 spaced inwardly of clamps 12 to both strengthen and lighten the cylindrical clamping system 10. Serving to support circular frame elements 14 for rotation about an axially extending axis is a cylindrical rotatable shaft 18 which has extending from each end a spindle 20 which can be mounted within bearing members 22. Each bearing member 22 is in turn fixedly attached to a laterally extending support beam 24. The support beams 24 are in turn supported at a vertical position in a common horizontal plane above the ground level 26 by a plurality of upstanding support beams 28 together with a plurality of laterally extending inclined beams 30. The supporting structure must be sized to support a significant amount of weight that will be transmitted to the support structure through bearings 22. To provide additional support and rigidity to the support structure, a plurality of laterally extending horizontal beam members 32 extend between a pair of axially extending horizontal base beam members 34, all of which are substantially at ground level 26. Additionally, another axially extending beam member 36 is positioned so as to be slightly offset from a vertical plane through the axis of rotation and extends between lateral base beams 32. In addition to providing a support function, the axial base beam 36 has the function of supporting the edge platen rams which will be more fully described later.

Extending about the top half of multi-opening clamping system 10 is a covering or shroud 38, indicated in phantom lines. Shroud 38 may be positioned over the upper half of system 10, if desired, for several reasons. One reason might be to enclose the rotating clamping system 10 for safe operation while another reason might be to insulate and retain heat for adhesive bonding purposes. Since shroud 38 is not a required part of the present invention, it will not be described further except to point out that it should be comprised of insulating material if it is used to retain heat.

Referring primarily now to FIG. 3, the indexing mechanism is generally indicated at 40 and may be positioned at either or both ends of multi-opening clamping system 10 although in the embodiment depicted it is positioned at the infeed end, generally indicated at 42. It could, however, as noted, be positioned at the outfeed end which is generally indicated at 44. Indexing mechanism 40, which will be described in greater detail later, serves to rotate cylindrical multi-opening system 10 about its rotating axis in an indexing fashion for proper sequencing of the unloading, loading and clamping functions. The opening 12 where loading may take place, during the time that indexing mechanism 40 is in a locked position, is the loading station generally indicated at 46. At loading station 46 a pair 48 of individual elongated triangular-shaped pieces, each indicated at 50 and with the thin edge of one approximately adjacent the thick edge of the other is axially fed into the clamping mechanism 12 comprising loading station 46 by any suitable means. The next adjacent clamping mechanism 12, in a clockwise direction when referring to FIG. 3, is that opening where the clamping pressures are applied to the pair 48 of triangular-shaped pieces and is the clamping station generally indicated at 52. Inwardly directed forces are applied at clamping station 52 by way of a plurality of substantially upwardly extending individual edge platen rams, each indicated at 54. Each edge platen ram 54 is fixedly attached to axially extending base beam 36 in a directed manner such that the ram end 56 of each edge platen ram 54 will engage bearing members 58 that depend downwardly from the bottom of clamping station 52. The bearing members 58 form an integral part of each individual clamping mechanism 12 as will become more apparent later.

The unloading station is generally indicated at 60 and is depicted as including an individual opening 12 adjacent, in a counterclockwise direction, to the loading station 46. While the embodiment depicted shows an unloading station that is adjacent the loading station 46, the two could be combined into one opening 12 whereby a next incoming pair of triangular-shaped pieces would push the preceding pair axially downstream and out of multi-opening clamping system 10.

A pair of inclined cam surfaces, each indicated at 62, are positioned at each end of multi-opening clamping system 10 on supports 64 and function to provide a part of the opening mechanism for each individual clamping mechanism 12 after pairs 48 are suitably cured. Additional details of the opening mechanism, which is generally indicated at 66, will be described later.

Figure 4:
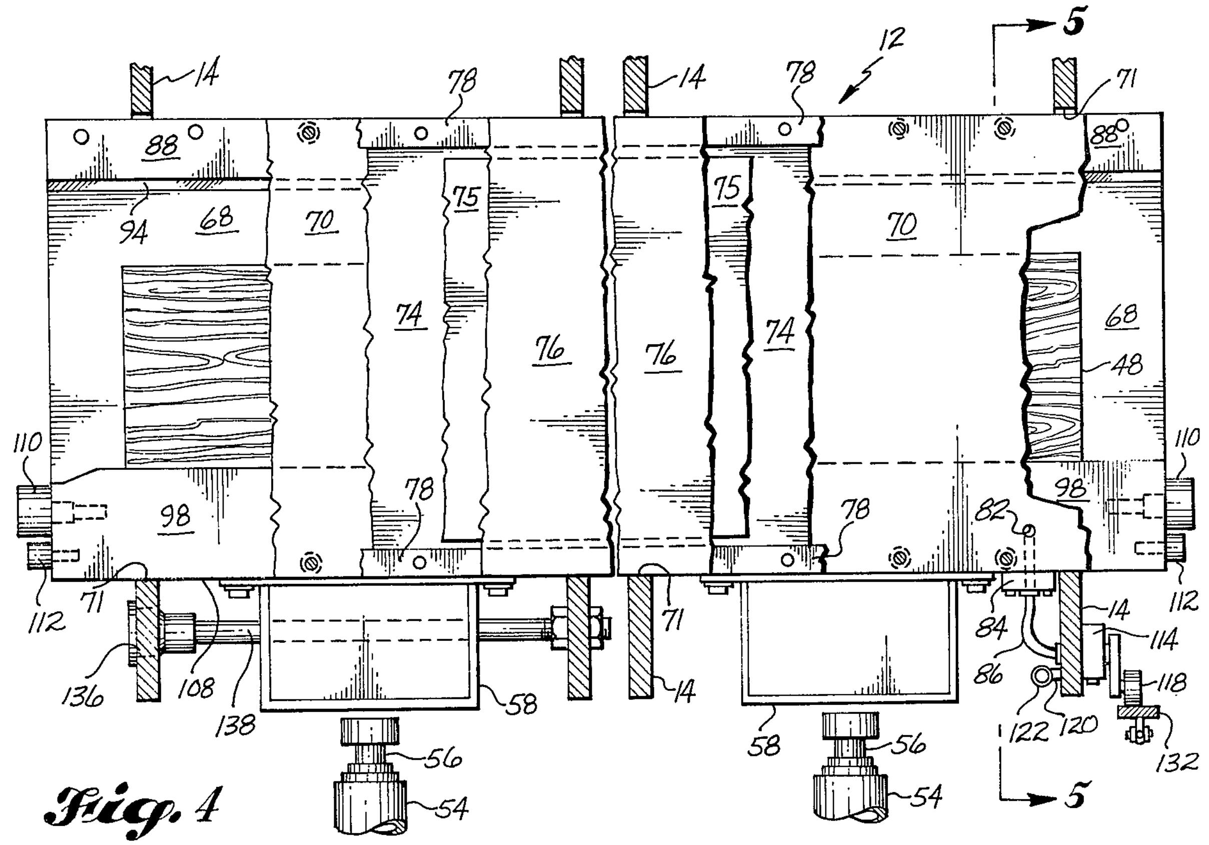
FIG. 4 is a side elevation view of an individual clamping mechanism showing its various elements.
Figure 5:
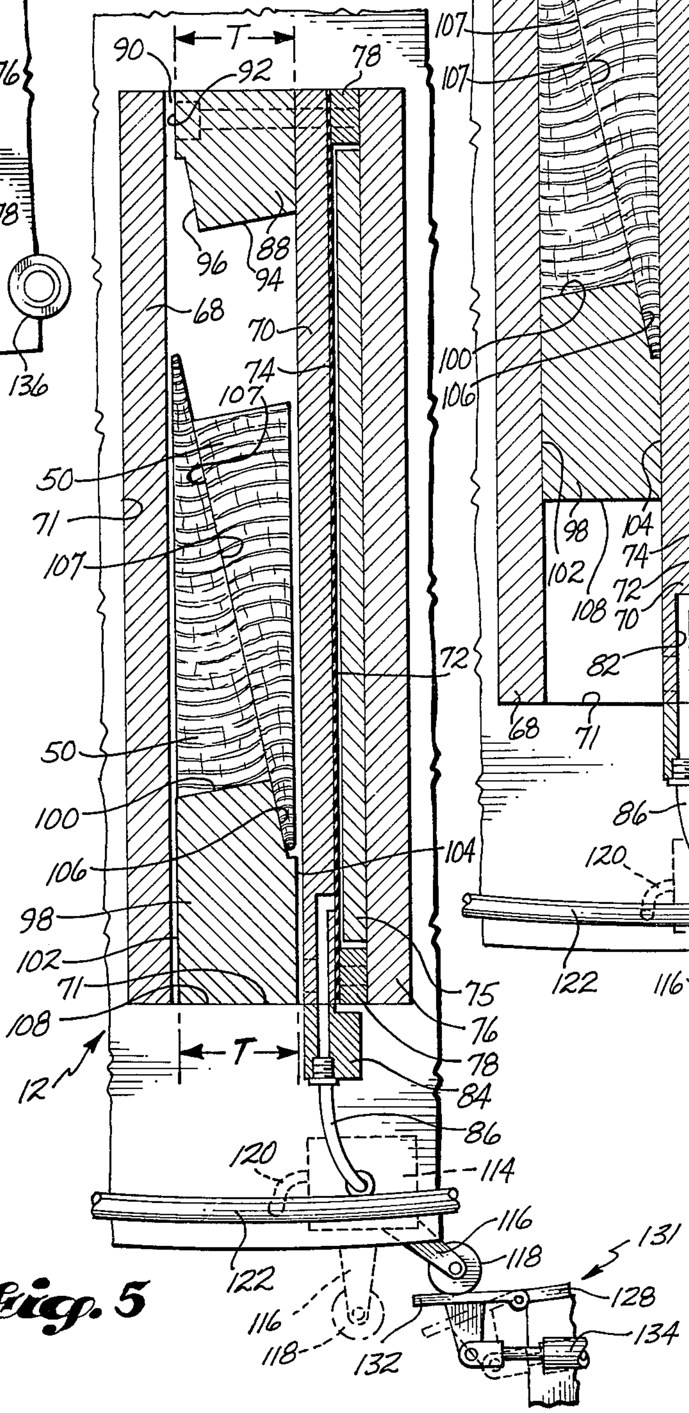
FIG. 5 is a section view taken along line 5—5 of FIG. 4 and shows an individual clamping mechanism with all platens in their retracted positions.

Referring now to FIGS. 4–8, a detailed description will be given of an individual clamping mechanism 12 and more specifically of a clamp when at loading station 46 and clamping station 52. In FIGS. 4 and 5, the clamping mechanism is in the condition where the two individual elongated triangular-shaped pieces 50 comprising pair 48 can be fed into opening 12. Each individual clamping mechanism is comprised of a plurality of platens with a first fixed face platen being indicated at 68. Platen 68 is designated as a face platen in that ultimately it will be in a juxtaposed relationship with one of the elongated side faces of a triangular piece 50. The second of a pair of face platens is indicated at 70 and is mounted so as to be movable laterally with respect to fixed platen 68 while maintaining a substantially parallel relationship therewith. It will be recognized that platens 68, 70 will extend in the axial direction for the length of multi-opening clamping system 10 and will be supported within aligned cutouts 71 in frame elements 14. The mechanism that allows second face platen 70 to move laterally with respect to fixed platen 68 is comprised in part of an elongated pressure chamber 72 defined by a surface of platen 70 and an elongated flexible air bladder 74 that can be sequentially pressurized with air bladder 74 positioned such that its exterior surface will abutt an axially extending rectangular filler member 75 which in turn bears against an elongated fixed side plate 76. Side plate 76 provides a bearing surface against which filler member 75 can bear when bladder 74 causes second face platen 70 to move toward face platen 68. Serving to limit the amount of lateral movement of platen 70 away from platen 68 is the edge stop member 78. Edge stop member 78 is fixedly attached to second face platen 70 and extends completely around the periphery to act as both a sealing device for bladder 74 and lateral movement control means for platen 70. It also serves, in part, to limit together with filler member 75 the maximum expansion (lateral movement) of bladder 74. A conduit 82 extends through face platen 70 and opens into the volume within pressure chamber 72. A fitting 84 is attached to the other opening of conduit 82 for the connection of air line 86. Air line 86 is comprised of a flexible high-strength material in order to accommodate the lateral movement of face platen 70 since fitting 84 will move with platen 70.

Positioned axially along the upper edge of face platen 70 and firmly attached thereto along the side face, opposite that to which bladder 74 is attached, is the first edge platen 88. Since edge platen 88 is fixed to face platen 70, it will also move laterally with respect to fixed face platen 68. One of the functions of edge platen 88 is to allow setting of the final thickness of pair 48 and thus the platen thickness dimension "T" indicated on FIG. 5 is selected to determine the thickness of the final pair. When face platen 70 and edge platen 88 are in their laterally retracted position, an axially extending gap 90 will separate face platen 68 from the flat axially extending side face 92 of edge platen 88, the gap dimension being determined by the thickness edge stop member 78. The axially extending front edge face 94 of platen 88 is slightly inclined in order to accommodate the particular edge configuration of elongated triangular-shaped pieces 50. The face 94 can take any suitable configuration in order to accommodate the shape of the edge of piece 50. In addition to setting the predetermined thickness, edge platen 88 acts as a thrust stop when the individual elongated triangular-shaped pieces 50 are forced into position. A relief section 96 is provided along the side face and front face of platen 88 in order to accommodate any small axially extending apex of a triangular-shaped piece as it is forced into position for clamping.

Spaced apart from edge platen 88 and extending axially along the bottom of each opening 12 is a second edge platen 98. Second edge platen 98 is similar to edge platen 88 in that it has a thickness dimension "T" for setting the final thickness of pair 48 and also in that it has an axially extending inclined front edge face 100 substantially parallel to front edge face 94. Second edge platen 98 is, however, free to slidably move between first and second face platens 68, 70 and towards and away from first edge platen 88.

Axially extending flat side faces 102, 104 on platen 98 are substantially parallel and are suitable for sliding between parallel face platens 68, 70 when edge platen 98 is forced toward the opposite edge platen 88. Similar to relief section 96 but positioned within the side and front edges of platen 98 diagonally therefrom is a similarly sized relief section 106. It should be recognized that it is second edge platen 98 which acts to position the two triangular-shaped pieces 50 relative to each other within a clamping mechanism, pushing one piece of the pair against edge face 94 while the other piece is slidably adjusted along the juxtaposed inclined surface 107. The movement of slidable platen 98 is caused by rams 54 with the ram ends 56 of each impacting on bearing members 58, each of which is fixedly attached to and axially spaced along the bottom edge 108 of platen 98. The rams 54 move platen 98 inwardly, uniformly adjusting the width of the pair and simultaneously setting the thickness of the pair against the stop member 78. A pressure switch (not shown) within the hydraulic circuit of rams 54 limits the applied edge pressure to a predetermined amount which is sufficient to set the width and thickness of the pair. The face platens 68, 70 are then caused to move together by pressurizing chamber 72 in order to apply side face pressure to pair 48, to set the final thickness of pair 48, and to lock slidable edge platen 98 in place for the cure cycle (see FIGS. 6 and 7).

Positioned on the ends of each slidable edge platen 98 are cam rolls 110 and holding bars 112. The opposed cam rolls 110 are substantially coaxial and form a part of opening mechanism 66. They, during operation, revolve with multi-opening clamping system 10 on their respective platens until they physically contact inclined cam surfaces 62 at which time cam surfaces 62 will begin forcing cam rolls 110 in a direction whereby the second edge platens 98 will move back to their retracted open positions. This occurs after the pressure is released from chamber 72 as will become apparent later. Holding bars 112 are also substantially coaxially positioned and extend laterally for a distance which is greater than the distance between face platens 68, 70 in the open position and they serve to restrain and confine each of the movable platens within the cutouts 71.

Another feature depicted in FIGS. 4–7 is the control valve 114. There is a separate control valve 114 associated with and forming a part of each clamping mechanism 12 in order to control the sequencing of the clamping action, including pressurizing the chamber 72. Each valve 114 is operated by a pivoting arm 116 to which is attached a cam roll 118. Leading into each valve 114 is feed line 120 which is connected to a circumferentially extending pressurized air supply line 122. Air supply line 122 is in turn connected to a source of air under pressure which may be plenum chamber 124 defined by the inner surface of the cylindrical rotatable shaft 18. Rotatable shaft 18 would then be sourced to an air compressor (not shown) through a suitable connection means 126 positioned at the end of shaft 18 (FIGS. 1 and 2). The cam surface that causes each pivoting arm 116 to properly sequence valves 114 is a curvilinear surface indicated at 128 and has a supporting plate 130 to hold it in the proper spatial orientation with respect to cam rolls 118. When each pivoting arm 116 is in its down position, the respective pressure chambers 72 will be pressurized and conversely when the curvilinear cam surface 128 causes the pivoting arms 116 to move upwardly to their up position, chambers 72 will be depressurized, venting air through valve 114. By releasing the pressure exerted by face platens 68, 70 on pair 48, slidable platen 98 can then move to its retracted position as can the face platens 68, 70. Curvilinear cam surface 128 terminates at a lower end 131 approximately adjacent that opening comprising clamping station 52 and has a short pivoting section 132 which can be actuated on command by positioning cylinder 134 to drop each arm 116 as it reaches section 132. Cylinder 134 is activated to drop arms 116 in response to the buildup of edge pressure against the pair 48 in clamping station 52 and when an arm drops, valve 114 will then allow pressurized air to fill the chamber 72, thereby applying side face pressure.

Figure 6:
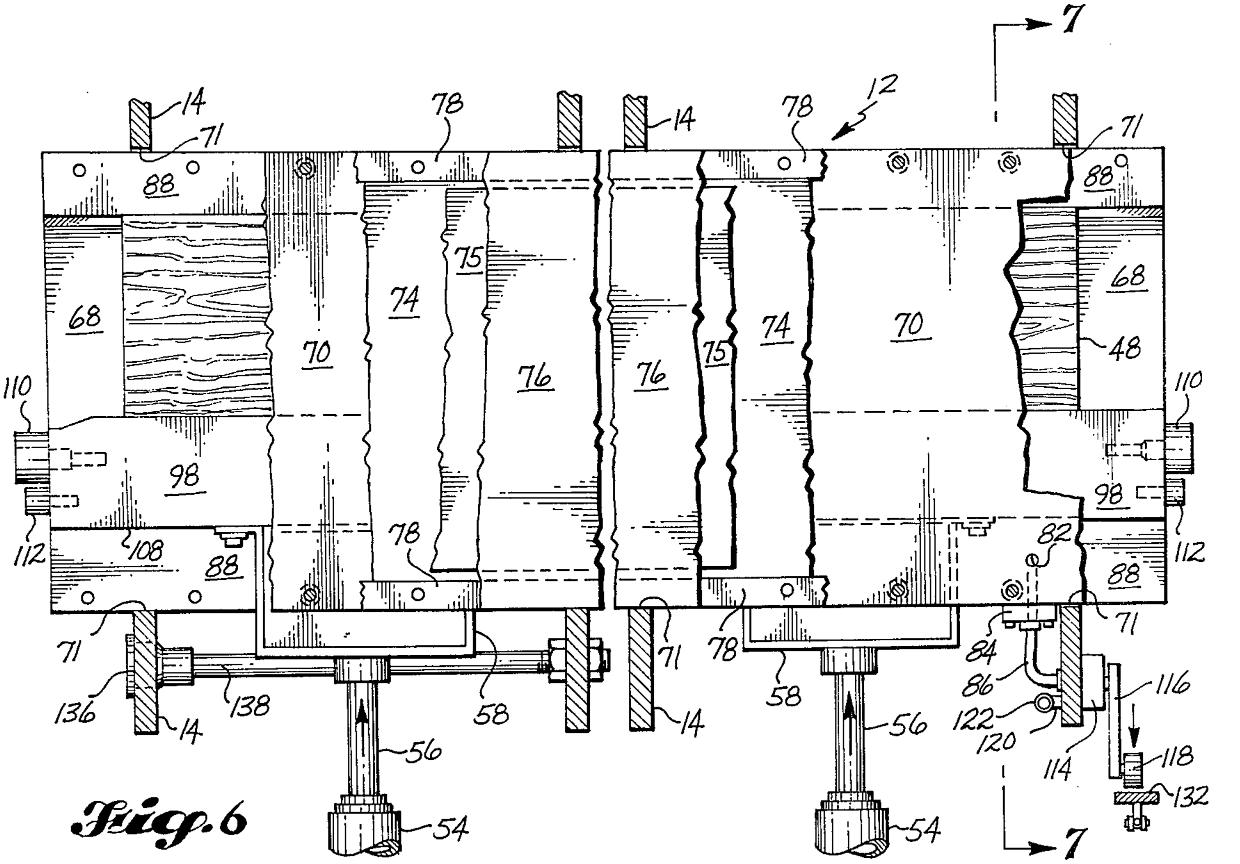
FIG. 6 is a view similar to FIG. 4 showing an individual clamping mechanism with its platens in their positions for clamping.
Figure 8:
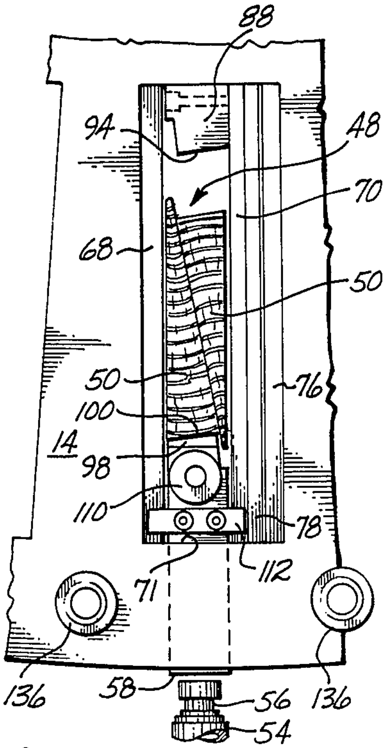
FIG. 8 is an end elevation view showing more detail of an individual clamping mechanism.
Figure 7:
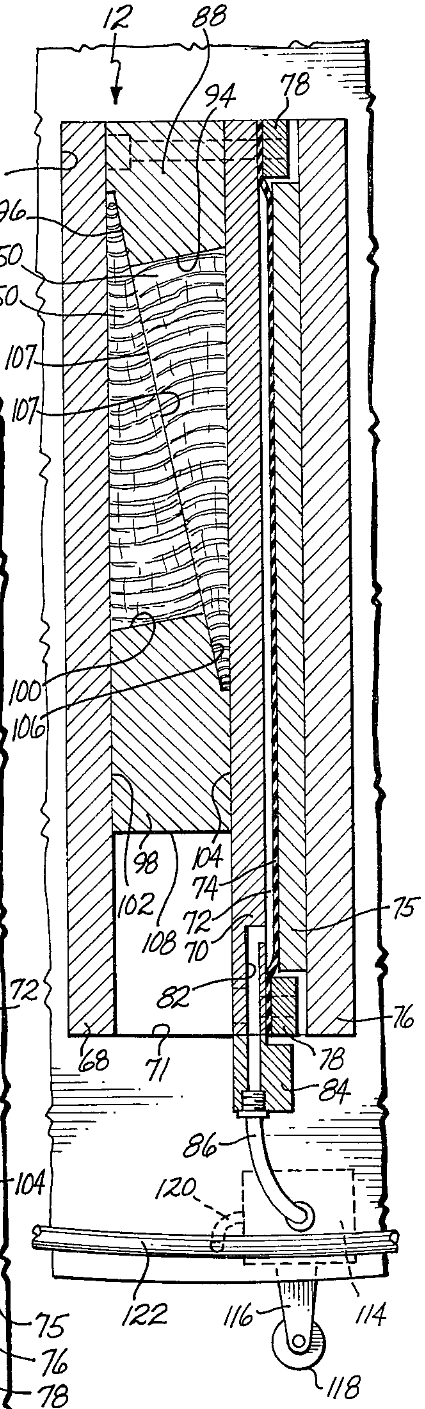
FIG. 7 is a view similar to FIG. 5 and shows the platens in their clamped positions bearing against the pair of elongated triangular-shaped pieces.

In FIGS. 6, 7 and 9, that opening comprising clamping station 52 with the slidable edge platen 98 in its clamped position is depicted. As may be seen clearly in FIG. 9, each ram end 56 is extended, forcing the edge face 100 of platen 98 against the edge of a triangular-shaped piece 50. While five edge platen rams 54 are depicted in the figures, another number could be utilized provided they collectively exert a uniformly distributed force on edge platen 98. Rams 54 are connected in parallel and, as will be apparent to one skilled in the art, may be comprised of double-acting hydraulic cylinders connected to the same source of pressurized fluid.

Indexing mechanism 40 as depicted in the figures includes a plurality of indexing pin receptacles 136 spaced circumferentially about the periphery of one outer frame element 14. Each receptacle 136 is positioned in frame element 14 between adjacent clamping mechanisms in order to provide the proper alignment for each opening as they revolve to sequentially become an unloading station, a loading station, and then a clamping station. To properly attach each receptacle 136, a supporting shaft 138 extends from the interior base thereof to the next adjacent frame element 14 and is attached thereto.

Figure 11:
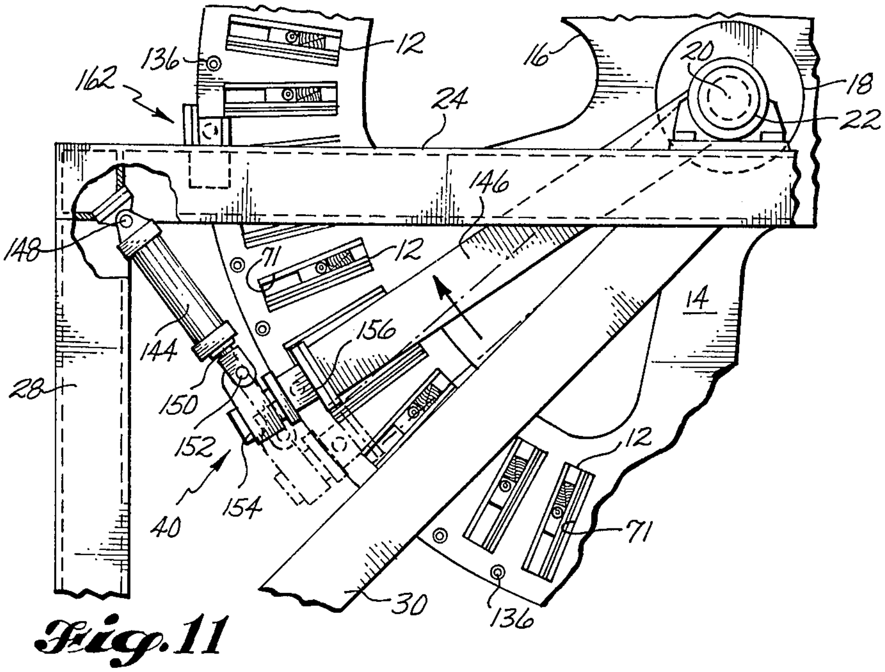
FIG. 11 is a partial end elevation view depicting the indexing mechanism for rotating the frame of the multi-opening clamping system.
Figure 10:
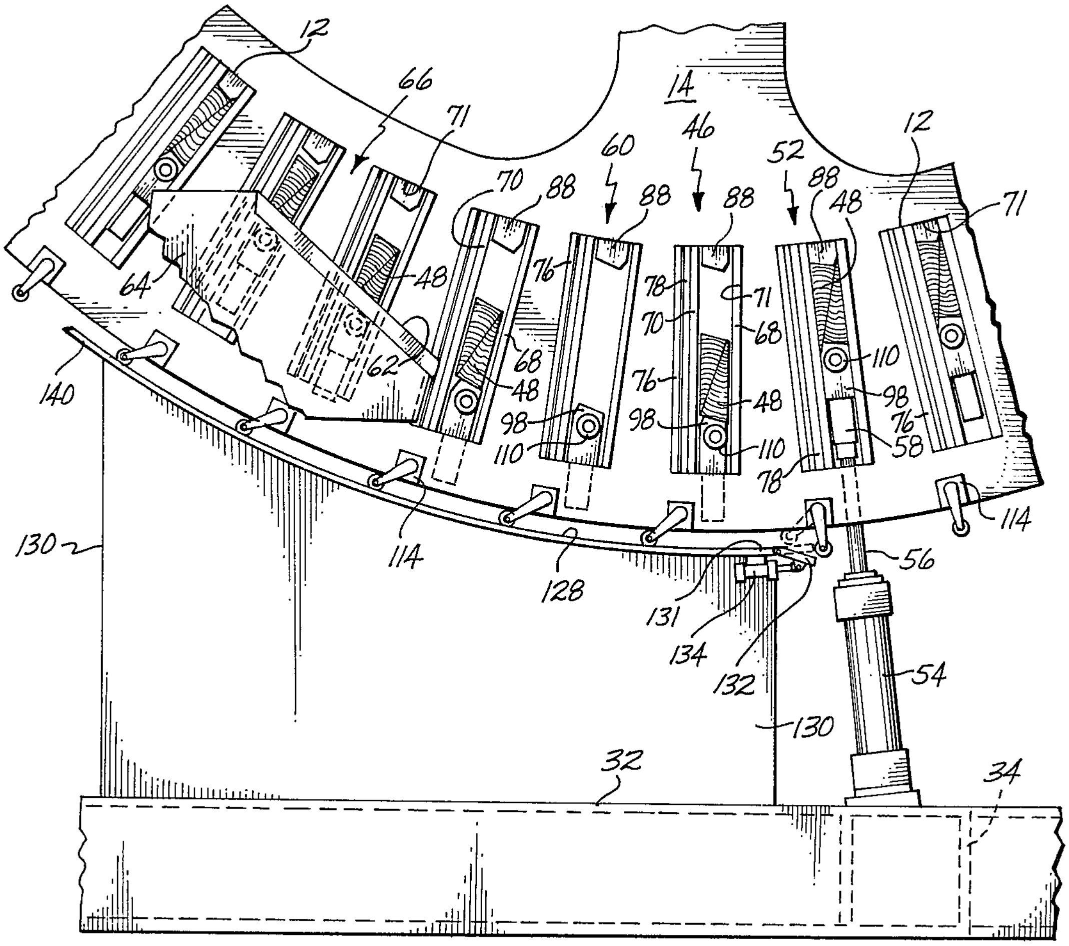
FIG. 10 is a partial end elevation view showing a portion of the multi-openings and depicts the loading, unloading, and clamping stations in relation to each other.

Turning now specifically to FIGS. 10 and 11, additional details will be described of the indexing mechanism 40 and the unloading station 60 with its attendant opening mechanism 66. With respect to the opening and unloading mechanisms, as previously noted, they consist in part of control valves 114, curvilinear cam surface 128, cam rolls 110, and inclined cam surfaces 62. At the uppermost end 140 of cam surface 128, the cam rolls 118 associated with the pivoting arms of control valves 114 will impact the surface 138 and thereby cause an arm 116 to pivot upwardly. As previously pointed out, this allows the associated chamber 72 to depressurize, thereby allowing the platens to return to their own retracted positions. Once the pressure is released, in order to positively retract the slidable edge platen 98, cam rolls 110 will impact inclined cam surfaces 62 and the edge platen 98 will be positively conveyed to its retracted position. Once a clamping mechanism 12 revolves past the end of the inclined cam surfaces 62 and is unloaded, that opening can then be loaded with a pair of uncured elongated triangular-shaped pieces 50 for clamping together. As previously noted at the lower end 131 of curvilinear cam surface 128, the pivoting arms 116 will, in a controlled manner, be caused to return to their downwardly extending positions thereby pressurizing that chamber 72 at clamping station 52.

Figure 12:
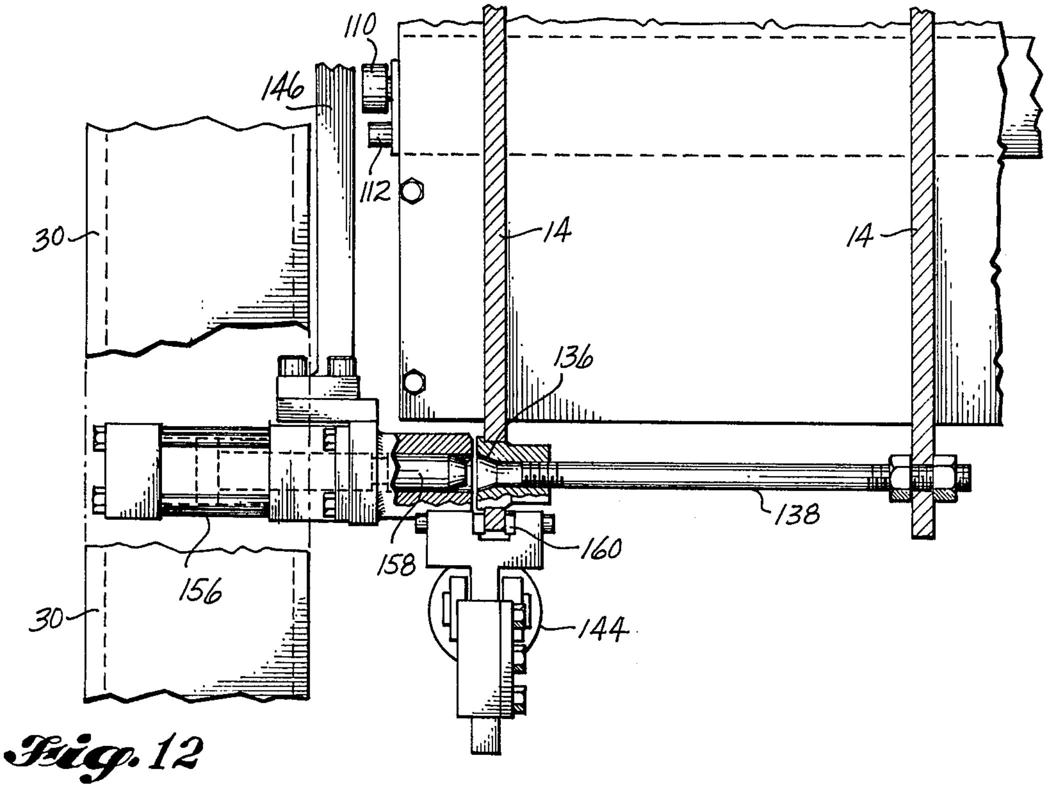
FIG. 12 is a section view taken through line 12—12 of FIG. 3 and depicts a part of the locking mechanism for indexing of the rotary clamping system.

Indexing mechanism 40 is comprised, in part, as previously pointed out of indexing pin receptacles 136. The actuating portion of indexing mechanism 40 is comprised of a downwardly depending inclined actuating cylinder 144 which is supported during its indexing movements by a radially extending turning arm 146 which is fixedly attached to rotatable shaft 18. Actuating cylinder 144 is pinned at connection point 148 to a support beam. At the end of ram 150 is another pinned connection point 152 connecting the actuating cylinder to an attachment member 154 fixed to the end of turning arm 146. Fixed to the outer end of turning arm 146 and extending in an axial direction and positioned radially so as to be coaxial with each pin receptacle 136 is an indexing pin cylinder 156 (see FIG. 12). Actuating cylinder 156 has, on its ram end, an axially movable indexing pin 158 which, when in the extended position, will fit within a coaxial indexing pin receptacle 136. Serving to guide the indexing pin cylinder 156 and confine it to its intended positions is guide member 160 which tracks about the peripheral edge of the outer frame element 14. As will be appreciated, when the cylindrical multi-opening clamping system is to be indexed one unit, the indexing pin 158 will be inserted into a corresponding pin receptacle 136 and the actuating cylinder 144 will then retract its ram 150 a predetermined amount. Cylinder 144 retracts in response to a signal indicating that the pressure chamber at clamping station 52 is fully impressurized.

Figure 13:
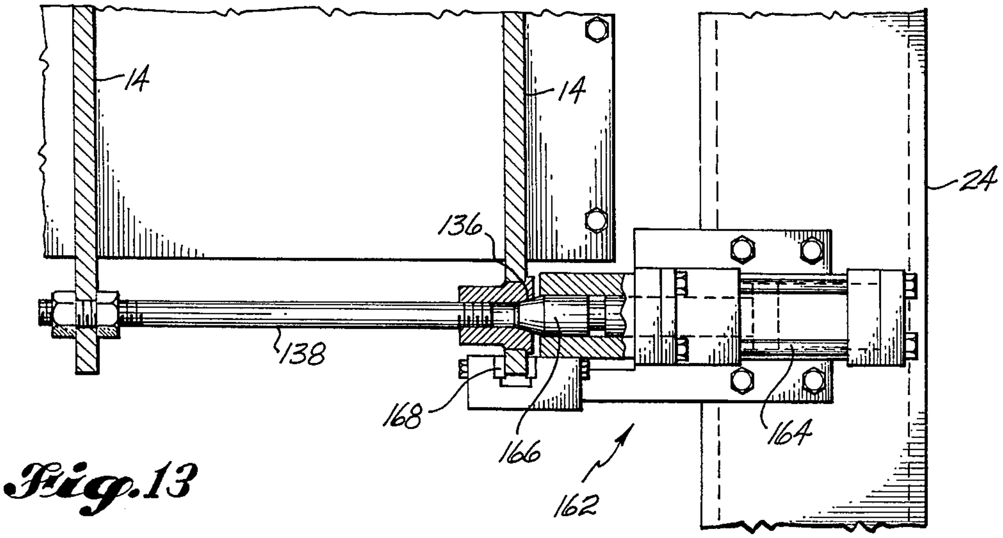
FIG. 13 is also a section view taken along line 13—13 of FIG. 3 and shows another part of the locking mechanism for indexing the clamping system.

Serving to lock multi-opening system 10 in position during the time period that unloading, loading, and clamping occur is a locking mechanism generally indicated at 162 in FIG. 13. Locking mechanism 162 is mounted at a convenient position, for example, adjacent the base end of inclined actuating cylinder 144 on the laterally extending support beam 24. It is comprised of a controlled small actuating cylinder 164 having a locking pin 166 on the end of its ram for insertion into a corresponding indexing pin receptacle 136 when cylindrical system 10 is to remain stationary. Similar to guide member 160, the locking mechanism 162 has a guide member 168 in order to allow proper tracking and positioning of locking pin 166. When all of the individual clamping mechanisms are locked in position by having locking pin 166 within a pin receptacle 136, the indexing mechanism can then move downwardly by the extension of ram 150 in preparation for the next indexing movement. Of course, when this occurs, pin 158 will be in its retracted position for free movement to the next adjacent clamping mechanism.

OPERATION OF THE INVENTION

In describing the structure of the present invention, certain operations were also described. However, in order to fully understand the operating sequence and certain operating parameters, a description will be given of a typical operating cycle. First, two elongated triangular-shaped pieces 50 are positioned within the open clamping mechanism at loading station 46 by any suitable means. A suitable adhesive will have been spread on at least one of the juxtaposed surfaces being clamped together. The clamping system 10 is then indexed and locked to position the unclamped pair 48 at clamping station 52.

At clamping station 52 the first step in the clamping action is for edge platen rams 54 to begin forcing slidable edge platen 98 and pair 48 inwardly to the point where pair 48 will impact front edge face 94. The rams continue to exert a uniform pressure on edge platen 98, allowing the triangular-shaped pieces 50 to slip relative to each other, and forcing the face platen 70 its fixed distance away from face platen 68 as set by stop member 78. The two outer faces of pair 48 will become oriented in a substantially parallel relationship while the width of the pair is set by the pieces themselves depending on their individual widths. Once a suitable uniform pressure is applied to pair 48 through rams 54, the pivoting section 132 will be dropped, thereby activating valve 114 allowing pressurization of the particular pressure chamber 72. Chamber 72 will become fully pressurized up to the maximum pressure for clamping. As movable face platen 70 is urged toward face platen 68, it will exert a sufficient pressure to cause the two juxtaposed pieces to slip slightly apart to a position where platen 70 will then impact against both edge platens, thereby locking slidable edge platen 98 in place along side faces 102, 104 while setting the final thickness of the pair to be cured. When the final pressurization has occurred, all platens will be clamped and locked in place for the balance of the curing cycle and the edge platen rams 56 will be retracted for indexing and the next clamping cycle. The clamped-together pair will then index around for the duration of the cure cycle and when the particular clamping mechanism reaches a position adjacent the uppermost end of curvilinear cam 128 its associated valve 114 is caused to open when arm 116 impacts surface 128. This action depressurizes chamber 72 and, as previously pointed out, all platens are then caused to return to their open retracted positions. Any suitable means will then be operable to unload the cured pair at unloading station 60 once the particular clamping mechanism is indexed to that position. At the loading station 46 another pair to be clamped is then charged into the open clamping mechanism and it is indexed to the clamping station.

As an example and intended only to illustrate some actual operating parameters when utilizing available fast-curing adhesives for joining wooden pieces, a cure time might be something on the order of 2.50–3.00 minutes and thus the multi-opening clamping system 10 is sized accordingly in terms of the number of individual clamping mechanisms 12. In the embodiment depicted there are 48 openings and this number allows a production rate of approximately 15 cured pairs per minute. A suitable clamping pressure measured perpendicular to the juxtaposed faces in a pair would be approximately 100 psi.

While a detailed description of the present invention has been given, it is to be understood that many changes and modifications may be made without departing from the spirit of the invention and all such modifications are intended to be included within the scope of the appended claims.

What is claimed is:

1. A width adjusting thickness setting clamping apparatus for clamping together at least one pair of elongated substantially triangular-shaped solid pieces with the thin edge of one approximately adjacent the thick edge of the other, an individual clamping mechanism comprising:

a first edge platen having a predetermined thickness dimension positioned between a pair of face platens, said pair of face platens being substantially parallel to each other with at least one of said face platens being movable relative to the other between a clamped position and a retracted position, a second edge platen slidable between said pair of face platens and having a predetermined thickness dimension substantially similar to said first edge platen, means for moving said second edge platen toward said first edge platen when said face platens are substantially in their retracted positions allowing a pair of said pieces positioned within a clamping mechanism to slide relative to one another, thereby adjusting the width of said pair, and means for moving at least one of said face platens toward the other and into said clamped position abutting said first and second edge platens and said pair of said pieces, thereby setting the thickness dimension of said pair.

2. An individual clamping mechanism as in claim 1 in which said first and second edge platens have contoured faces for accommodating the edges of said pieces.

3. An individual clamping mechanism as in claim 1 in which said first edge platen is fixedly attached to one of said face platens.

4. An individual clamping mechanism as in claim 1 in which said means for moving said second edge platen includes a plurality of rams arranged and adapted to releasably engage and push said second edge platen toward said first edge platen, said rams being adapted to exert uniform controlled pressure on said second edge platen.

5. An individual clamping mechanism as in claim 1 in which said means for moving at least one of said face platens includes a pressure chamber positioned adjacent its back side arranged and adapted to sequentially become pressurized, thereby causing said face platen to move toward the other face platen, and depressurized, thereby allowing said face platen to move to said retracted position.

6. An individual clamping mechanism as in claim 1 including stop means associated with said movable face platen for setting said retracted position.

7. A clamping apparatus as in claim 1 in which a plurality of said clamping mechanisms are mounted about the periphery of a rotatable frame.

8. A clamping apparatus as in claim 7 in which said means for moving said second edge platen in each clamping mechanism includes a plurality of rams at a single location arranged and adapted to releasably engage and push each of said second edge platens toward said first platen as said clamping mechanisms on said frame rotate past said rams.

9. A clamping apparatus as in claim 7 including means for rotating said frame in a sequential motion.

* * * * *

UNITED STATES PATENT OFFICE
CERTIFICATE OF CORRECTION

PATENT NO. : 4,101,372

DATED : July 18, 1978

INVENTOR(S) : EARL DEAN HASENWINKLE, ET AL.

It is certified that error appears in the above-identified patent and that said Letters Patent are hereby corrected as shown below:

On the abstract page, under the heading United States Patent, "Hansenwinkle et al." should read --Hasenwinkle et al.--;

on the abstract page, under the title WIDTH ADJUSTING THICKNESS SETTING CLAMPING SYSTEM, inventor "Earl Dean Hansenwinkle" should read --Earl Dean Hasenwinkle--;

in column 8, line 40, "surface 138" should read --surface 128--;

and in column 8, line 43, "own" should read --open--.

Signed and Sealed this

*Nineteenth* Day of *December 1978*

[SEAL]

*Attest:*

RUTH C. MASON
*Attesting Officer*

DONALD W. BANNER
*Commissioner of Patents and Trademarks*